United States Patent
Abe et al.

(10) Patent No.: US 8,705,473 B2
(45) Date of Patent: Apr. 22, 2014

(54) BASE STATION APPARATUS, MOBILE TERMINAL APPARATUS AND COMMUNICATION CONTROL METHOD

(75) Inventors: Tetsushi Abe, Tokyo (JP); Nobuhiko Miki, Tokyo (JP); Satoshi Nagata, Tokyo (JP); Sangiamwong Jaturong, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/261,462

(22) PCT Filed: Apr. 5, 2011

(86) PCT No.: PCT/JP2011/058611
§ 371 (c)(1),
(2), (4) Date: Dec. 10, 2012

(87) PCT Pub. No.: WO2011/126008
PCT Pub. Date: Oct. 13, 2011

(65) Prior Publication Data
US 2013/0077576 A1 Mar. 28, 2013

(30) Foreign Application Priority Data
Apr. 5, 2010 (JP) .................................. 2010-087390

(51) Int. Cl.
H04W 16/16 (2009.01)
H04W 16/32 (2009.01)
H04W 72/04 (2009.01)

(52) U.S. Cl.
USPC ........... 370/329; 370/203; 370/492; 370/236; 370/501

(58) Field of Classification Search
None
See application file for complete search history.

(56) References Cited

U.S. PATENT DOCUMENTS

| | | | | |
|---|---|---|---|---|
| 8,149,825 B2* | 4/2012 | Kubler et al. | ................ | 370/388 |
| 8,406,795 B2* | 3/2013 | Lane et al. | ................ | 455/502 |
| 8,488,534 B2* | 7/2013 | Miki et al. | ................ | 370/329 |
| 2009/0092090 A1* | 4/2009 | Beems Hart et al. | ........ | 370/329 |

OTHER PUBLICATIONS

R1-094916, 3GPP TSG RAN WG1 Meeting #59; Jeju, Korea, Nov. 9-13, 2009; Source: NTT DoCoMo; Titled: Views on Deployment Scenarios in Heterogeneous Networks, was Agenda Item: 7.7.1; Document for: Discussion and Decision.*

R1-100902, 3GPP TSG RAN WG1 meeting #60; R1-100902; San Francisco, USA, Feb. 22-26, 2010; Source: CATT; Titled: Considerations on Interference Coordination in Het-Net, was Agenda Item: 8.2.2; Document for: Discussion and Decision.*

(Continued)

*Primary Examiner* — Andrew Lai
*Assistant Examiner* — Hoyet H Andrews, III
(74) *Attorney, Agent, or Firm* — Osha Liang LLP

(57) ABSTRACT

To partially suppress interference to control channels of a pico-cell from a base station apparatus of a macro-cell and enable assignment of user data to a subframe besides the same subframe using a part of control channels with interference suppressed thereto, a base station apparatus disposed in a second system having a system band comprised of a plurality of component carriers for sharing at least a part of a frequency band with a first system having a macro-cell (C2) and covering a pico-cell (C1) is configured to generate a carrier indicator for indicating another component carrier to which user data is assigned besides the same component carrier on a control channel of the component carrier, while indicating another subframe to which user data is assigned besides the same subframe on the downlink control channel.

22 Claims, 17 Drawing Sheets

(56) References Cited

OTHER PUBLICATIONS

R1-100033, 3GPP TSG RAN WG1 meeting #59bis, Valencia, Spain, Jan. 18-22, 2010; Source: CATT; Titled: Interference Analysis for Various Het-Net Scenarios was Agenda Item: 8.2.1; Document for: Discussion and Decision.*

3GPP TR 32.816 V8.0.0 (2008-12), Technical Report; 3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8).*

Notification of Reasons for Rejection w/translation issued for Japanese Patent Application No. 2010-087390, dated Jul. 10, 2012, (5 pages).

International Search Report w/translation from PCT/JP2011/058611 mailed May 17, 2011 (4 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

INDICATOR BITS
INTERPRETATION METHOD 1

| INDICATOR BITS | INFORMATION |
|---|---|
| 000 | PRESENT SUBFRAME |
| 001 | 1 SUBFRAME LATER |
| --- | |
| 111 | 7 SUBFRAMES LATER |

FIG. 7

| INDICATOR BITS | CARRIER INDEX | SUBRFAME INDEX |
|---|---|---|
| 000 | 1 | PRESENT SUBFRAME |
| 001 | 1 | 2 |
| 010 | 1 | 7 |
| 011 | 1 | 8 |
| 100 | 2 | PRESENT SUBFRAME |
| 101 | 2 | 2 |
| 110 | 2 | 7 |
| 111 | 2 | 8 |

FIG. 15

BASE STATION APPARATUS, MOBILE TERMINAL APPARATUS AND COMMUNICATION CONTROL METHOD

TECHNICAL FIELD

The present invention relates to a base station apparatus, mobile terminal apparatus and communication control method in the next-generation mobile communication system.

BACKGROUND ART

In UMTS (Universal Mobile Telecommunications System) networks, for the purpose of improving spectral usage efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Literature 1). In LTE, as a multiplexing scheme, OFDMA (Orthogonal Frequency Division Multiple Access) different from W-CDMA is used in downlink, while SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). In LTE-A (LTE Release 10), a Heterogeneous network configuration is studied in which importance is attached to a local area environment in addition to conventional cellular environments.

CITATION LIST

Non-Patent Literature

[Non-patent Document 1] 3GPP, TR25.912 (V7.1.0), "Feasibility Study for Evolved UTRA and UTRAN", September 2006

SUMMARY OF THE INVENTION

Technical Problem

The present invention was made in view of such a respect, and it is an object of the invention to provide a base station apparatus, mobile terminal apparatus and communication control method for enabling control adapted to interference inside a Heterogeneous network to be performed to support the next-generation mobile communication system.

Solution to Problem

A base station apparatus of the invention is a base station apparatus disposed in a second system having a system band comprised of a single or a plurality of base frequency blocks, for sharing at least a part of a frequency band with a first system having a large-scale cell and covering a small-scale cell and is characterized by having an indication information generating section configured to generate indication information for indicating another base frequency block to which user data is assigned besides the same base frequency block on a downlink control channel of the base frequency block, while indicating another subframe to which user data is assigned besides the same subframe on the downlink control channel, and a transmission frame generating section configured to generates a transmission frame including the indication information.

Technical Advantage of the Invention

According to the invention, it is possible to assign user data to another subframe indicated by the indication information besides the same subframe on the downlink control channel. Accordingly, by indicating a subframe of a control channel that undergoes interference from the first system using the indication information, it is possible to assign user data of the subframe that undergoes interference on the control channel of the subframe that does not undergo interference. Further, another subframe to which user data is assigned besides the same subframe is indicated using the indication information for indicating another base frequency block to which user data is assigned besides the same base frequency block on the control channel, and it is thereby possible to make the control configuration simplified.

BRIEF DESCRIPTION OF THE DRAWINGS

FIG. 7 is an explanatory view of a first interpretation method of a carrier indicator in the pico-cell;

FIG. 15 is an explanatory view of an interpretation method of a carrier indicator in the macro-cell;

DESCRIPTION OF EMBODIMENTS

Figure 1:
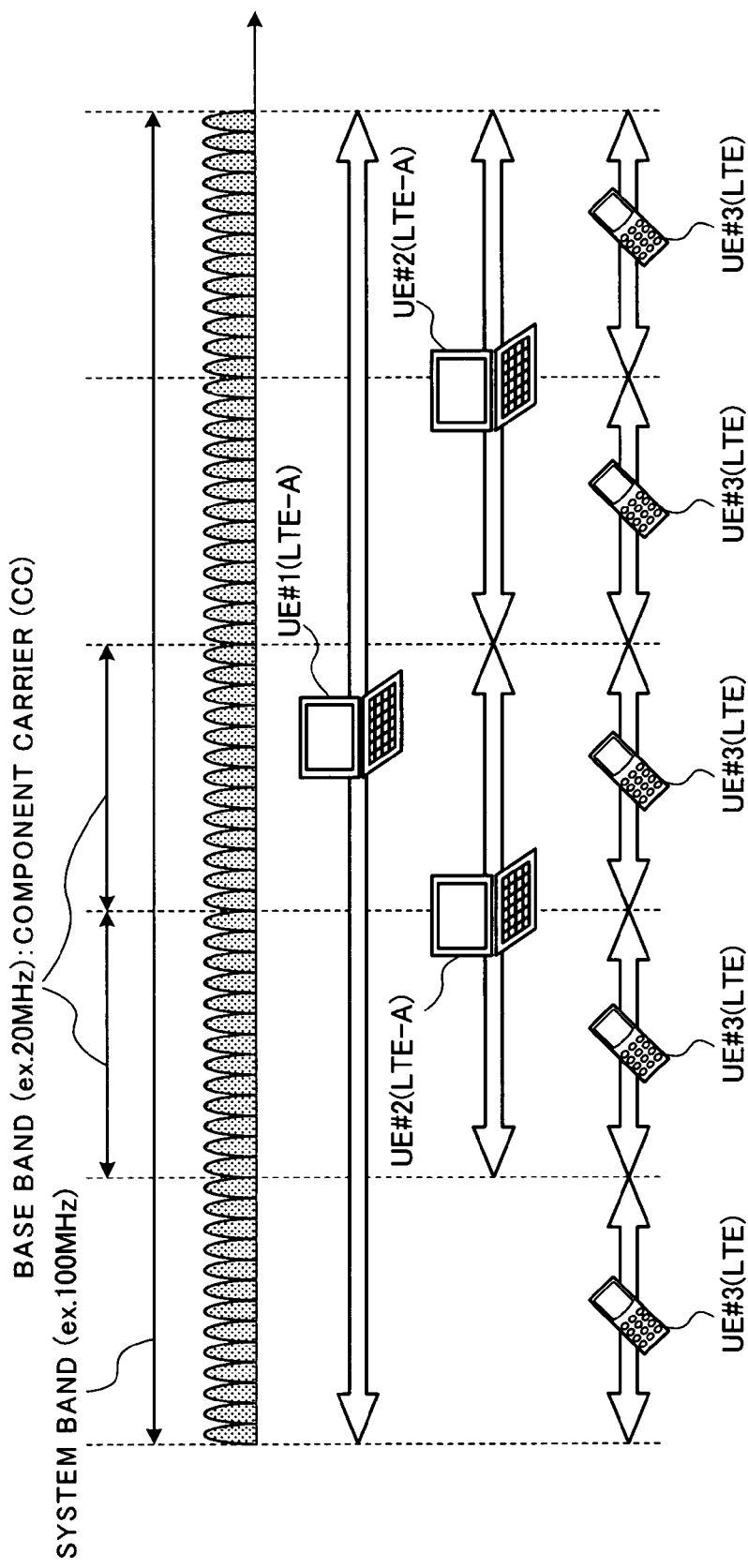
FIG. 1 is an explanatory view of a system band of an LTE system.

FIG. 1 is a diagram to explain a frequency usage state when mobile communications are performed in downlink. In addition, in the following descriptions, a base frequency block is described as a component carrier. The example as shown in FIG. 1 is of the frequency usage state in the case of coexistence of LTE-A systems that are first communication systems having first relatively wide system bands comprised of a plurality of component carriers, and LTE systems that are second communication systems having a second relatively narrow system band (herein, comprised of a single component carrier). In the LTE-A systems, for example, radio communications are performed with a variable system bandwidth of 100 MHz or less, and in the LTE systems, radio communications are performed with a variable system bandwidth of 20 MHz or less. The system band of the LTE-A system is at least one base frequency region (component carrier: CC) with a system band of the LTE system as a unit. Thus integrating a plurality of base frequency regions to broaden the band is referred to as carrier aggregation.

For example, in FIG. 1, the system band of the LTE-A system is a system band (20 MHz×5=100 MHz) containing bands of five component carriers where the system band (base band: 20 MHz) of the LTE system is one component carrier. In FIG. 1, a mobile terminal apparatus UE (User Equipment) #1 is a mobile terminal apparatus supporting the LTE-A system (also supporting the LTE system), and has the system band of 100 MHz, UE#2 is a mobile terminal apparatus supporting the LTE-A system (also supporting the LTE system), and has the system band of 40 MHz (20 MHz×2=40 MHz), and UE#3 is a mobile terminal apparatus supporting the LTE system (not supporting the LTE-A system), and has the system band of 20 MHz (base band).

Figure 2:
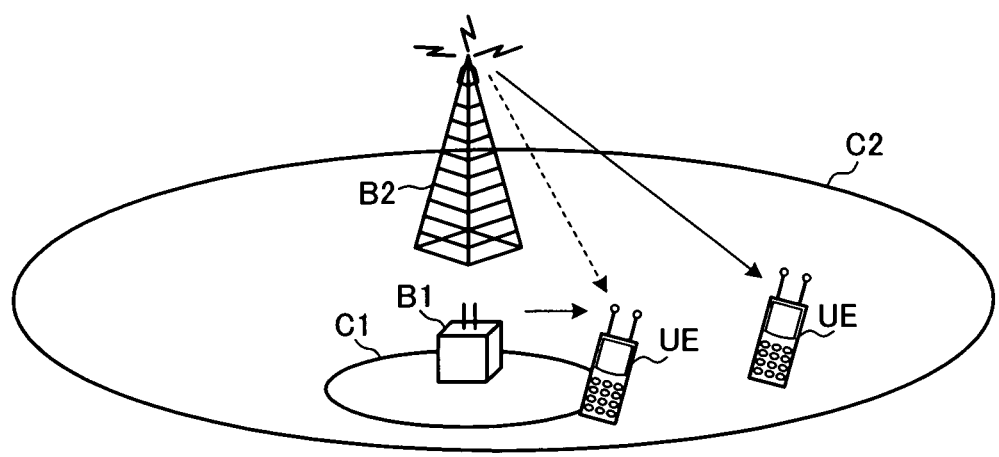
FIG. 2 is an explanatory view of the outline of a Heterogeneous network.

In addition, in the LTE-A system, a Heterogeneous network (hereinafter, referred to as HetNet) configuration is studied in which importance is attached to a local area environment. As shown in FIG. 2, the HetNet is a hierarchical network for overlaying various forms of cells such as a pico-cell C1 and femto-cell (small-scale cells) in addition to a conventional macro-cell C2 (large-scale cell). In the HetNet, a base station apparatus B2 of the macro-cell C2 for covering a relatively large area is set for downlink transmission power higher than a base station apparatus B1 of the pico-cell C1 for covering a relatively narrow area.

Figure 3:
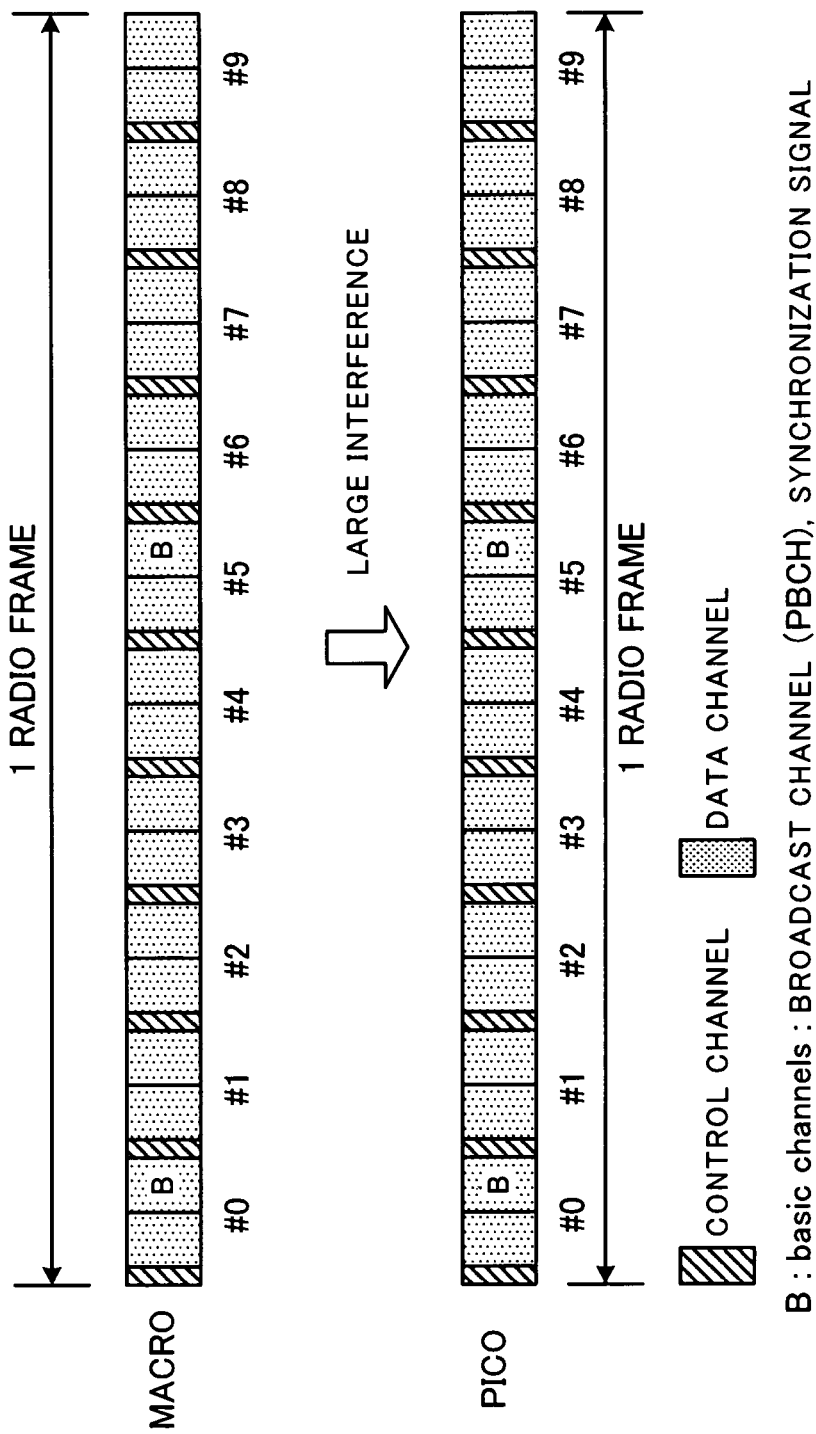
FIG. 3 is an explanatory view of interference between radio frames of a macro-cell and a pico-cell.

Accordingly, when the macro-cell C2 and the pico-cell C1 are operated with close frequency bands, as shown in FIG. 3, there is a problem that a radio frame from the base station apparatus B1 of the pico-cell C1 undergoes large interference from a radio frame from the base station apparatus B2 of the macro-cell C2. Therefore, in the pico-cell C1, coverage is narrowed by large interference from the macro-cell C2. Further, particularly a downlink control channel (PDCCH: Physical Downlink Control Channel) arranged at the beginning of a subframe is basically not retransmitted as distinct from a downlink data channel (PDSCH: Physical Downlink Shared Channel), and therefore, is given a significant effect by interference from the macro-cell C2. Furthermore, a broadcast channel (PBCH: Physical Broadcast Channel) shown by B in the subframe and cell-search synchronization signal (PSS: Primary Synchronization Signal, SSS: Secondary Synchronization Signal) are also not basically retransmitted, and therefore, are given a significant effect by interference from the macro-cell C2.

Figure 4:
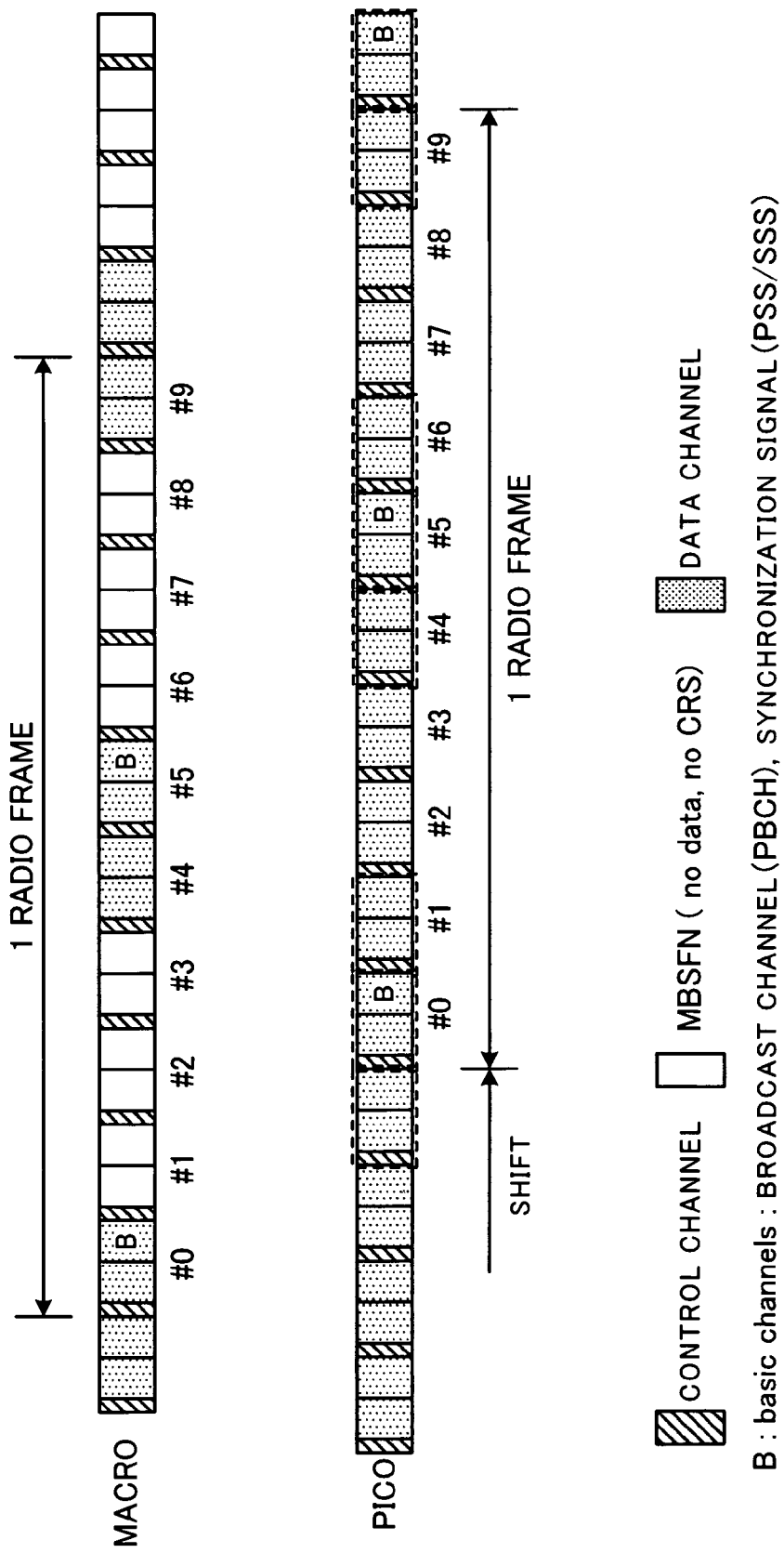
FIG. 4 is an explanatory view of an interference suppression method for radio frames of the micro-cell and the pico-cell.

To solve the problems, as shown in FIG. 4, considered is a method of using an MBSFN (Multimedia Broadcast multicast service Single Frequency Network) subframe and subframe shift. The MBSFN frame is specified in the LTE system, and is a subframe for enabling signals besides a control channel to be a blank period. According to this configuration, overlap of downlink control channels is canceled by radio frames of the macro-cell C2 and the pico-cell C1 being subframe-shifted in the time-axis direction. Further, the radio frame of the macro-cell C2 is partially provided with a blank period by the MBSFN subframe, and suppresses interference to the downlink control channels, broadcast channels and synchronization signals of the subframes enclosed by dashed lines of the pico-cell C1. As a result, coverage of the downlink control channel, broadcast channel and synchronization signal of the pico-cell C1 are ensured. Further, interference is also reduced to downlink data channels of the subframes enclosed by dashed lines of the pico-cell C1 by the blank periods of the radio frame of the macro-cell C2, and improvements in the data rate are expected.

However, in the aforementioned method, in subframes except the subframes enclosed by dashed lines of the pico-cell C1, the control channel undergoes interference from the radio frame of the macro-cell C2. The control channel of the downlink radio frame is used to transmit scheduling information of the data channel (PDSCH) in the same subframe, etc. i.e. assign user data in the same subframe. Therefore, when the downlink control channel undergoes interference, there is a problem that it is not possible to assign (schedule) user data in the same subframe.

Therefore, to solve the problem, the inventors of the invention arrived at the invention. In other words, it is the gist of the invention to suppress interference from the base station apparatus of a macro-cell partially to control channels of a pico-cell, and enable assignment of user data to subframes besides the same subframe using a part of control channels with interference suppressed thereto.

Figure 5:
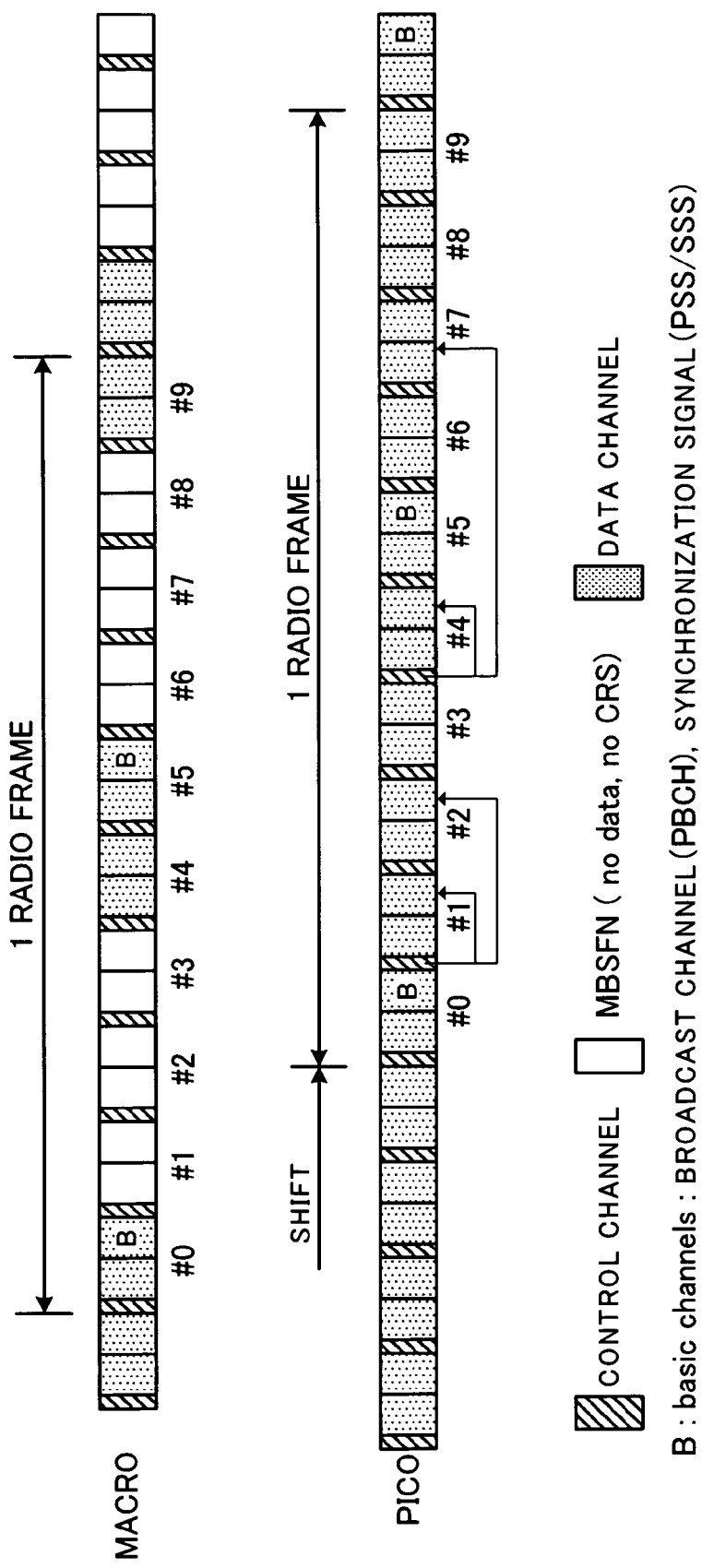
FIG. 5 is an explanatory view showing an example of a user data assignment method in a base station apparatus on the pico-cell side.

An Embodiment of the invention will specifically be described below with reference to accompanying drawings. FIG. 5 is an explanatory view showing an example of a user data assignment method.

As shown in FIG. 5, a downlink radio frame of the macro-cell C2 is comprised of 10 subframes of subframes #0 to #9, and a control channel (PDCCH) is multiplexed into OFDM symbols on the beginning side of each subframe. Further, the downlink radio frame of the macro-cell C2 has the above-mentioned MBSFN subframes, and blank periods are set except control channels of subframes except subframes #0, #4, #5 and #9. The broadcast channel (PBCH) and synchronization signals (PSS, SSS) for cell search are multiplexed into subframes #0 to #5.

Meanwhile, a downlink radio frame of the pico-cell C1 has the same radio frame configuration as the downlink radio frame of the macro-cell C2, but the subframe is not set for the blank period. Further, the downlink radio frame of the pico-cell C1 is subframe-shifted in the time-axis direction relatively to the radio frame of the macro-cell C2. By this means, a part of control channels, broadcast channels, synchronization signals and the like in the downlink radio frame of the pico-cell C1 are made coincident with the blank periods of the downlink radio frame of the macro-cell C2, and interference from the macro-cell C2 is suppressed. In this Embodiment, a part of control channels with interference suppressed thereto transmit scheduling information of data channels (PDSCHs) as a substitute for control channels to which interference is not suppressed.

For example, in the downlink radio frame of the pico-cell C1, a control channel of a subframe #1 corresponds to the blank period of the downlink radio frame of the macro-cell C2, and does not undergo interference from the macro-cell C2. The control channel of the subframe #1 transmits scheduling information of not only the data channel of the same subframe but also the data channel of a subframe #2 as a substitute for the control channel of the adjacent subframe #2 undergoing interference from the macro-cell C2. Thus, in the radio frame of the pico-cell C1, the control channel performs assignment of user data to not only the same subframe but also the adjacent subframe.

In addition, the control channel is capable of performing assignment of user data to not only the adjacent subframe but also a subsequent subframe. For example, in the downlink radio frame of the pico-cell C1, a control channel of a subframe #4 corresponds to the blank period of the radio frame of the macro-cell C2, and does not undergo interference from the macro-cell C2. In this case, the control channel of the subframe #4 transmits scheduling information of not only the data channel of the same subframe but also the data channel of a subframe #7 as a substitute for the control channel of the subframe #7 which is 3 subframes later and undergoes interference from the macro-cell C2.

Figure 6:
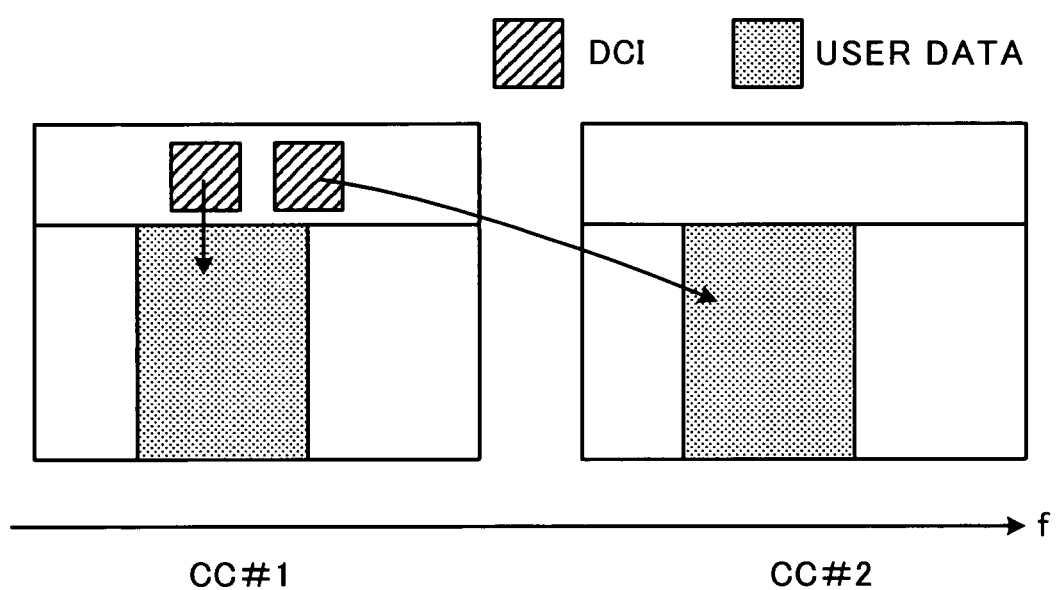
FIG. 6 is an explanatory view of cross-carrier scheduling.

Such assignment of user data to a plurality of subframes by the downlink control channel is performed using a carrier indicator (CI). Herein, the carrier indicator will be described briefly. In LTE-A, the band is broadened using a plurality of component carriers, and cross-carrier scheduling is considered. As shown in FIG. 6, instead of the component carrier (CC#2) undergoing strong interference from another cell, cross-carrier scheduling is to use a downlink control channel of another component carrier (CC#1) with a little effect of interference.

In this case, a carrier indicator of 3 bits as indication information is added to downlink control information (DCI) transmitted on the downlink control channel. The carrier indicator enables the downlink control channel to indicate another component carrier to which user data is assigned besides the same component carrier. By using this carrier indicator, the mobile terminal apparatus receives the downlink control information on the downlink control channel of a single component carrier, and receives downlink user data on downlink data channels of respective component carriers. In this Embodiment, the interpretation of the carrier indicator is modified, and it is made possible to perform assignment of user data to not only the same subframe but also a subsequent subframe by the control channel.

Figure 8:
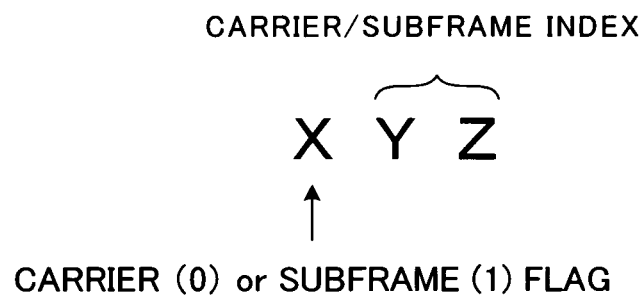
FIG. 8 is an explanatory view of a second interpretation method of a carrier indicator in the pico-cell.

The interpretation methods of the carrier indicator will be described with reference to FIGS. 7 and 8. FIG. 7 is an explanatory view of a first interpretation method of the carrier indicator. FIG. 8 is an explanatory view of a second interpretation method of the carrier indicator. In addition, in the following descriptions, the descriptions are given while assuming that the carrier indicator is of 3 bits, but the invention is not limited to this configuration. The number of bits of the carrier indicator is capable of being changed corresponding to the number of component carriers and the number of subframes.

As shown in FIG. 7, in the first interpretation method, the carrier indicator is interpreted as the number of subframes between a subframe of a downlink control channel and another subframe to which user data is assigned by the control channel. For example, in the carrier indicator, the case of "000" is interpreted as assignment of user data to the present subframe, and the case of "001" is interpreted as assignment to the adjacent subframe that is 1 subframe later. Accordingly, the carrier indicator added to the downlink control information enables assignment of user data to another subframe besides the same subframe by the control channel. In addition, in this case, information to determine whether the carrier indicator is for carrier indication or subframe indication may be notified separately.

As shown in FIG. 8, in the second interpretation method, the first bit, second bit and third bit of the carrier indictor are interpreted independently. The first bit is interpreted as a determination bit to determine whether the carrier indicator is for carrier indication or subframe indication. For example, when the first bit is "0", the carrier indicator is for carrier indication, and is used in above-mentioned cross-carrier scheduling. Meanwhile, when the first bit is "1", the carrier indicator is for subframe indication, and is used in scheduling of user data to another subframe besides the same subframe on the control channel.

Corresponding to a determination result of the first bit, the second and third bits are interpreted as index bits to identify a carrier index (base frequency block index) associated with each component carrier or a subframe index associated with each subframe. In addition, the carrier index associated with each component carrier may be fixed information assigned to each component carrier, or relative information to a component carrier that is the reference. Meanwhile, the subframe index associated with each subframe may be fixed information assigned to each subframe, or relative information to a subframe that is the reference. Accordingly, as in the first interpretation method, the subframe index is capable of being interpreted as the number of subframes between a subframe of a downlink control channel and another subframe to which user data is assigned by the control channel.

The second and third bits indicate a carrier index of a component carrier when the carrier indicator is determined as for carrier indication. Meanwhile, the second and third bits indicate a subframe index of a subframe when the carrier indicator is determined as for subframe indication. Thus, by combining the first bit and the second and third bits, it is possible to use the carrier indicator for carrier indication and for subframe indicator differently.

The carrier indicator is added for each downlink control information. By this means, on a single control channel, it is possible to distinguish between downlink control information for a plurality of subframes to transmit. In addition, the carrier indicator is not limited to the first and second interpretation methods as described above, and any interpretation method may be applied as long as the method is of configuration for indicating another subframe to which user data is assigned besides the same subframe on a downlink control channel.

In addition, it may be configured to beforehand notify a mobile terminal apparatus of information to interpret the carrier indicator by the first interpretation method or the second interpretation method. In this case, the base station apparatus is capable of changing the correspondence relationship between the carrier indicator, and the subframe and component carrier. Further, the mobile terminal apparatus may be configured to store the correspondence relationship between the carrier indicator, and the subframe and component carrier in a fixed manner.

Figure 14:
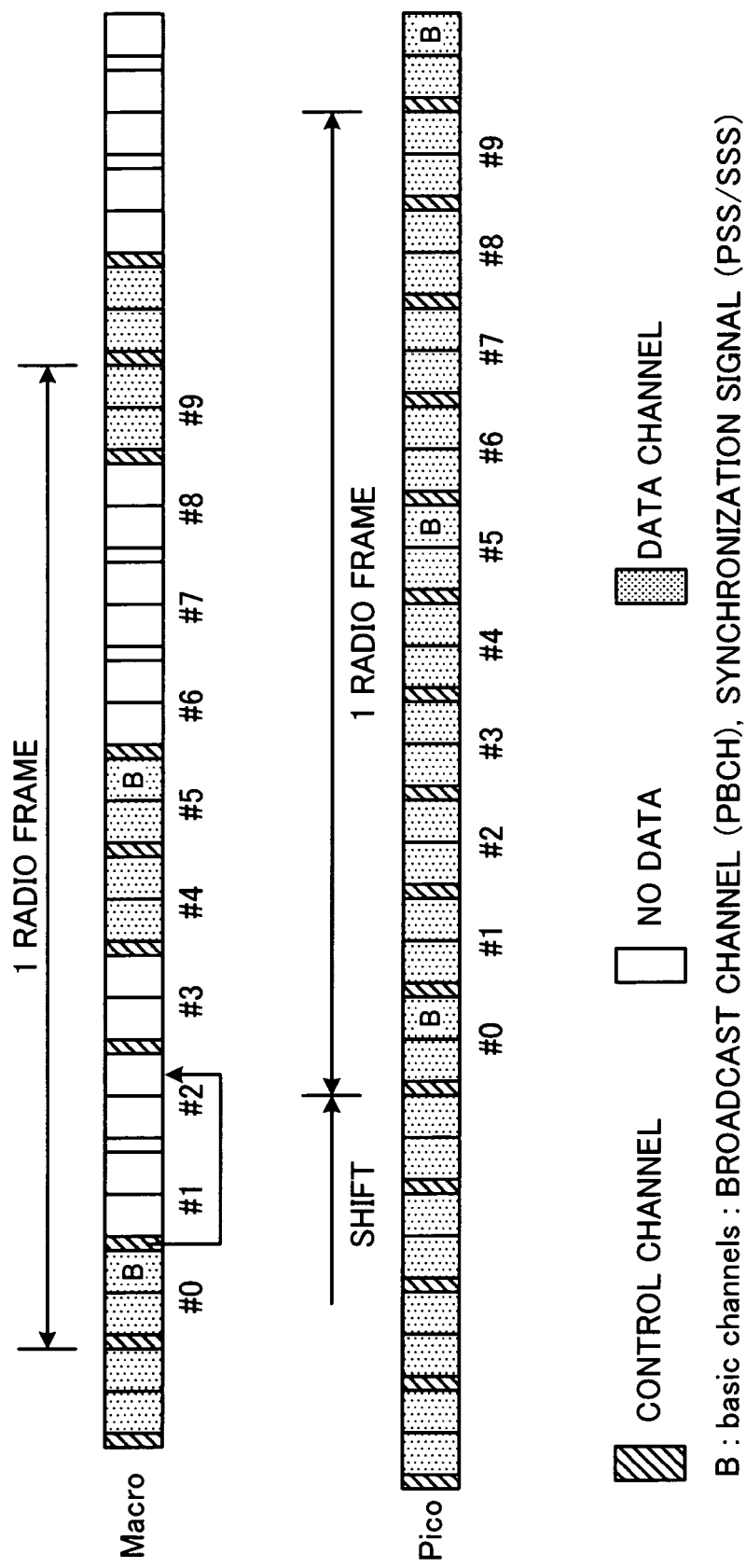
FIG. 14 is an explanatory view showing an example of a user data assignment method in the base station apparatus on the macro-cell side.

In addition, as shown in FIG. 14, in the base station apparatus on the macro-cell side, to suppress interference to the pico-cell C1 from the macro-cell C2, considered are circumstances that the downlink control channel of the macro-cell C2 is made off. In this case, using the above-mentioned carrier indicator, it is possible to assign user data to the subframe of the downlink control channel set for off by the downlink control channel that is not set for off. In addition, on of the downlink control channel indicates a state being capable of transmitting the downlink control information, and off of the downlink control channel indicates a state being not capable of transmitting the downlink control information.

For example, in the downlink radio frame of the macro-cell C2, the control channel of the subframe #2 is set for off to suppress interference to the downlink radio frame of the pico-cell C1. As a substitute for the control channel of the subframe #2, the control channel of the subframe #1 of the macro-cell C2 transmits the scheduling information of the data channel of the subframe #2. Thus, in the radio frame of the macro-cell C2, the control channel is configured to enable user data to be assigned to not only the same subframe but also to a subsequent subframe.

Referring to FIG. 15, described is the interpretation method of the carrier indicator when the base station apparatus on the macro-cell side performs user data assignment control. FIG. 15 is an explanatory view showing an example of the interpretation method of the carrier indicator in the macro-cell. In addition, in the following descriptions, the descriptions are given while assuming that the carrier indicator is of 3 bits, but the invention is not limited to this configuration. The number of bits of the carrier indicator is capable of being changed corresponding to the number of component carriers and the number of subframes.

As shown in FIG. 15, the carrier indicator is associated with the carrier index and the subframe index. In the example as shown in FIG. 14, since subframes in which the control channel is set for off are subframes #2, #7 and #8 in macro-cell C2, the carrier indicator is configured to enable indication to the present subframe and the subframes #2, #7 and #8. In addition, the carrier indicator is configured to be able to indicate component carriers CC#1 and CC#2 together with the subframe.

In addition, the carrier index described herein may be fixed information assigned to each component carrier, or relative information to a component carrier that is the reference. Meanwhile, the subframe index associated with each subframe may be fixed information assigned to each subframe, or relative information to a subframe that is the reference. Accordingly, the subframe index is capable of being interpreted as the number of subframes between a subframe of a downlink control channel and another subframe to which user data is assigned by the control channel.

For example, in the carrier indicator, the case of "000" is interpreted as assignment of user data to the present subframe of the component carrier CC#1. Meanwhile, in the carrier indicator, the case of "101" is interpreted as assignment of user data to the subframe #2 of the component carrier CC#2. Accordingly, the carrier indicator added to the downlink control information enables assignment of user data to another subframe besides the same subframe by the control channel.

In addition, it may be configured to beforehand notify a mobile terminal apparatus of information to indicate the correspondence relationship between the carrier indicator, and the subframe and component carrier. In this case, the base station apparatus is capable of changing the correspondence relationship between the carrier indicator, and the subframe and component carrier. Further, the mobile terminal apparatus may be configured to store the correspondence relationship between the carrier indicator, and the subframe and component carrier in a fixed manner.

Figure 9:
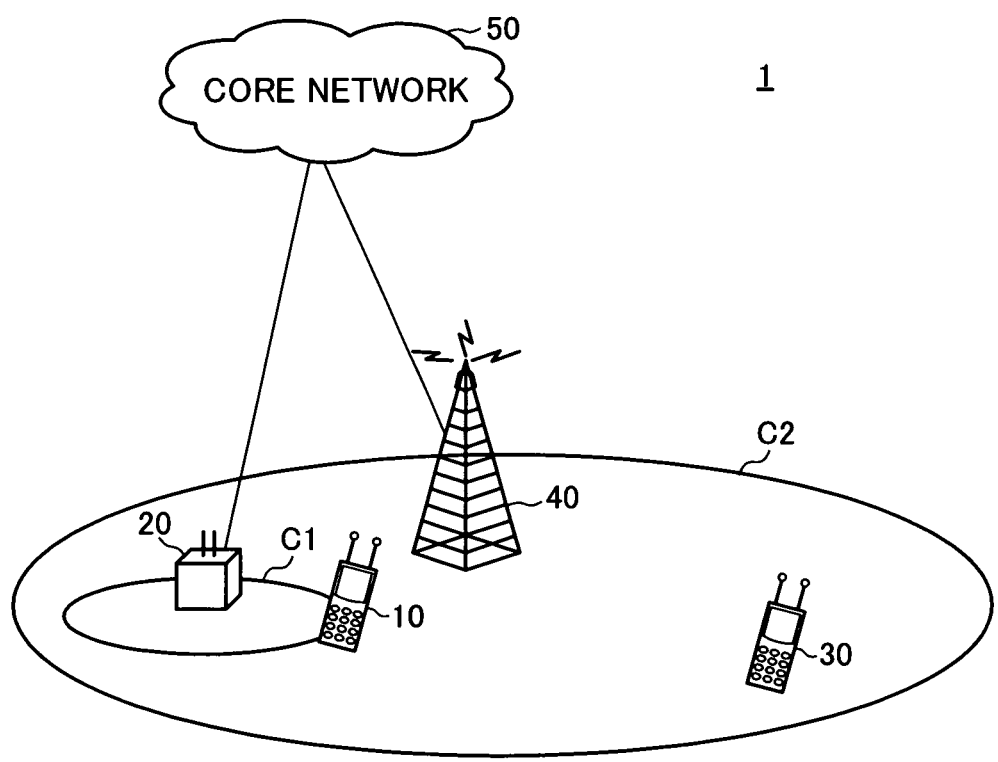
FIG. 9 is an explanatory view of a configuration of a radio communication system.

Herein, a radio communication system according to the Embodiment of the invention will be described specifically. FIG. 9 is an explanatory view of a system configuration of the radio communication system according to this Embodiment. In addition, for example, the radio communication system as shown in FIG. 9 is a system including the LTE system, or SUPER 3G. Further, the radio communication system may be called IMT-Advanced or may be called 4G.

As shown in FIG. 9, the radio communication system 1 is the HetNet, and a hierarchical network is constructed using the first system having the macro-cell C2 and the second system having the pico-cell C1. The first system includes the base station apparatus 40 that covers the macro-cell C2, and mobile terminal apparatuses 30 (only one is shown) that communicate with the base station apparatus 40 and is comprised thereof. The second system includes the base station apparatus 20 that covers the pico-cell C1, and mobile terminal apparatuses 10 (only one is shown) that communicate with the base station apparatus 20 and is comprised thereof. Each of the base station apparatuses 20, 40 is connected to an upper station apparatus, not shown, and is connected to a core network 50 via the upper station apparatus. In addition, for convenience in description, the description is given while assuming that equipments that perform radio communications with the base station apparatuses 20, 40 are mobile terminal apparatuses, and more generally, the equipments may be user equipments (UEs) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. Communication channels in downlink have the PDSCH as a downlink data channel shared among mobile terminal apparatuses, and downlink L1/L2 control channels (PDCCH, PCFICH, PHICH). User data and higher control information is transmitted on the PDSCH. Scheduling information of the PDSCH and PUSCH and others are transmitted on the PDCCH. The number of OFDM symbols used in the PDCCH is transmitted on the PCFICH (Physical Control Format Indicator Channel). ACK/NACK of HARQ (Hybrid Automatic Repeat reQuest) to the PUSCH is transmitted on the PHICH (Physical Hybrid-ARQ Indicator Channel).

Uplink communication channels have the PUSCH (Physical Uplink Shared Channel) as an uplink data channel shared among mobile terminal apparatuses, and the PUCCH (Physical Uplink Control Channel) that is an uplink control channel. User data and higher control information is transmitted on the PUSCH. Further, downlink radio quality information (CQI: Channel Quality Indicator), ACK/NACK and others are transmitted on the PUCCH.

Figure 10:
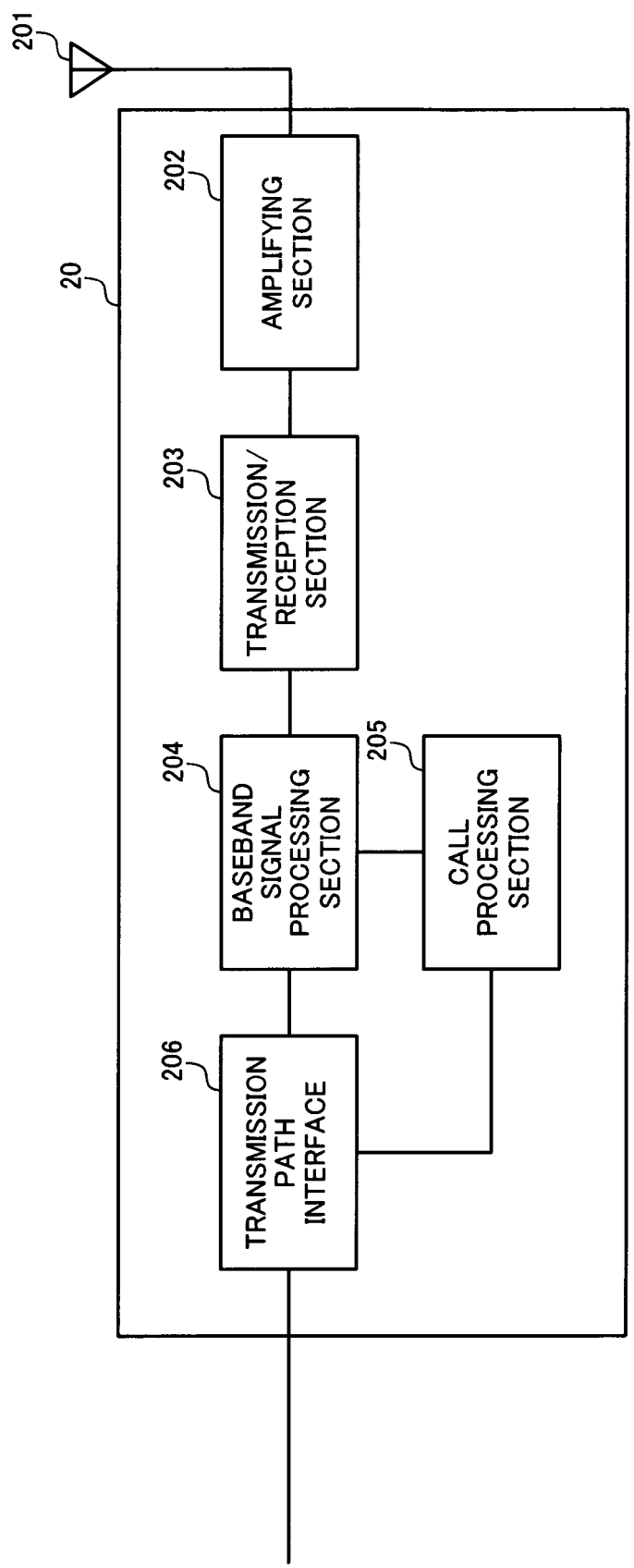
FIG. 10 is an explanatory view of the entire configuration of the base station apparatus.

Referring to FIG. 10, described is the entire configuration of the base station apparatus that covers the pico-cell according to this Embodiment. In addition, the base station apparatus that covers the macro-cell has the same configuration as that of the base station apparatus of the pico-cell, and the description thereof is omitted herein. Further, for convenience in description, the processing of signals transmitted from the mobile terminal apparatus to the base station apparatus in uplink is omitted.

The base station apparatus 20 is provided with a transmission/reception antenna 201, amplifying section 202, transmission/reception section 203, baseband signal processing section 204, call processing section 205 and transmission path interface 206. The user data transmitted from the base station apparatus 20 to the mobile terminal apparatus 10 in downlink is input to the baseband signal processing section 204 via the transmission path interface 206 from the upper station apparatus.

The baseband signal processing section 204 performs, on a signal of the downlink data channel, PDCP layer processing, segmentation and concatenation of the user data, RLC (Radio Link Control) layer transmission processing such as transmission processing of RLC retransmission control, MAC (Medium Access Control) retransmission control e.g. transmission processing of HARQ, scheduling, transmission format selection, channel coding, Inverse Fast Fourier Transform (IFFT) processing and precoding processing. Further, with respect to a signal of the downlink control channel, the transmission processing such as channel coding and Inverse Fast Fourier Transform is also performed. Furthermore, on the broadcast channel, the baseband signal processing section 204 notifies the mobile terminal apparatuses 10 connected to the same cell C1 of control information for each mobile terminal apparatus 10 to perform radio communications with the base station apparatus 20.

The transmission/reception section 203 converts the frequency of the baseband signal output from the baseband signal processing section 204 into a radio frequency band. The amplifying section 202 amplifies the transmission signal with the frequency converted to output to the transmission/reception antenna 201.

Figure 11:
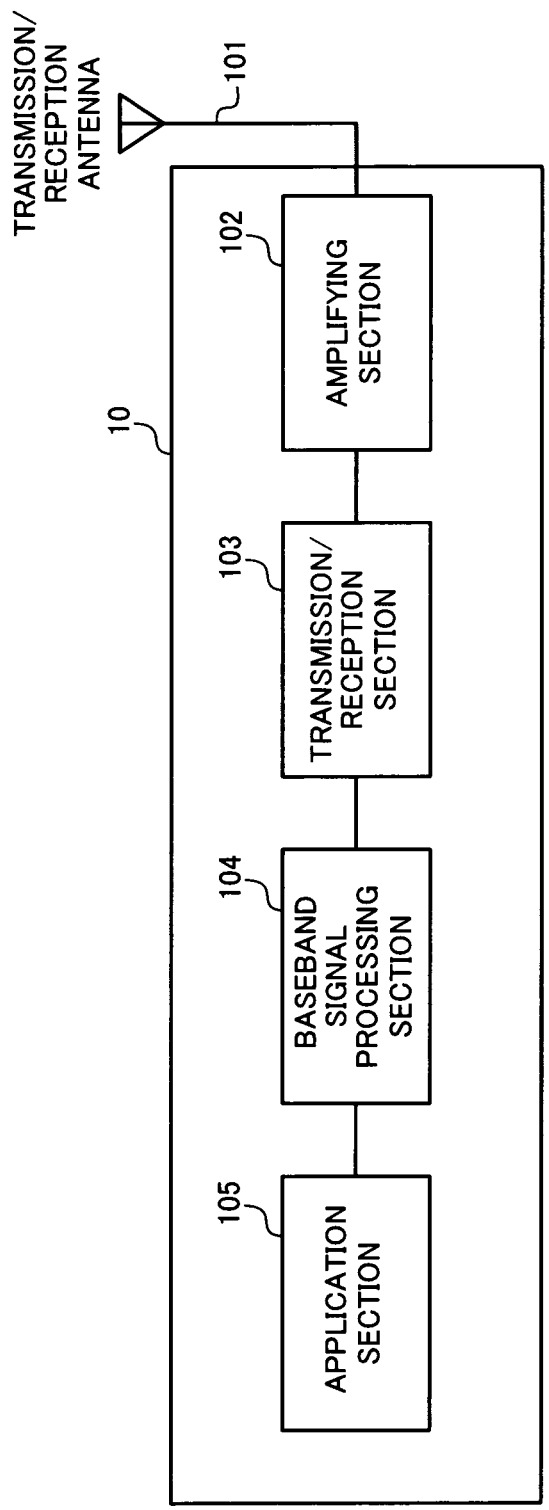
FIG. 11 is an explanatory view of the entire configuration of a mobile terminal apparatus.

Referring to FIG. 11, described is the entire configuration of the mobile terminal apparatus located in the pico-cell according to this Embodiment. In addition, the mobile terminal apparatus located in the macro-cell has the same configuration as that of the mobile terminal apparatus located in the pico-cell, and the description thereof is omitted herein. Further, for convenience in description, the processing of signals transmitted from the mobile terminal apparatus to the base station apparatus in uplink is omitted.

The mobile terminal apparatus 10 is provided with a transmission/reception antenna 101, amplifying section 102, transmission/reception section 103, baseband signal processing section 104 and application section 105. With respect to transmission data in downlink, a radio frequency signal received in the transmission/reception antenna 101 is amplified in the amplifying section 102, subjected to frequency conversion in the transmission/reception section 103, and is converted into a baseband signal.

The baseband signal processing section 104 performs, on the baseband signal, FFT processing, error correcting decoding, reception processing of retransmission control, etc. Among the data in downlink, user data in downlink is transferred to the application section 105. The application section 105 performs processing concerning layers higher than the physical layer and MAC layer and the like. Further, among the data in downlink, broadcast information is also transferred to the application section 105.

Figure 12:
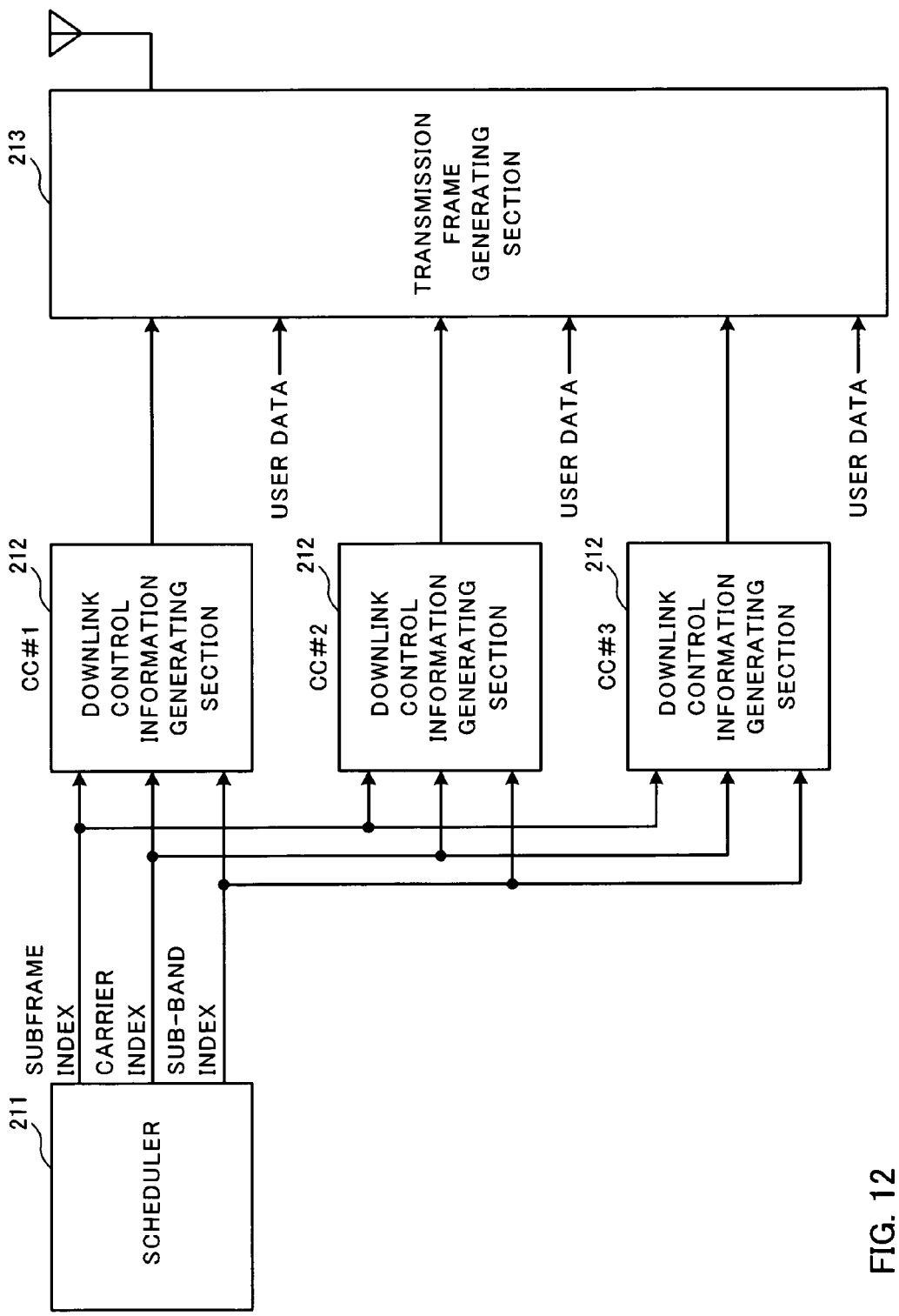
FIG. 12 is to explain a process of generating a downlink transmission frame in the base station apparatus that covers the pico-cell.

Referring to FIG. 12, described is a process of generating a downlink transmission frame in the base station apparatus that covers the pico-cell. FIG. 12 is a conceptual diagram of the process of generating a downlink transmission frame in the base station apparatus that covers the pico-cell according to this Embodiment. In addition, described herein is the process of generating a transmission frame in the case of applying the second interpretation method to the carrier indicator. FIG. 12 exemplifies the base station configuration capable of supporting maximum M component carriers (CC#1 to CC#M).

As shown in FIG. 12, the process of generating a transmission frame has a scheduler 211, downlink-control information generating sections 212, and a transmission frame generating section 213. In the case of performing cross-carrier scheduling, the scheduler 211 indicates a carrier index and a sub-band index (assignment frequency of user data) to the downlink control information generating section 212. In the example as shown in FIG. 6, since the component carrier CC#2 undergoes strong interference, the scheduler 211 indicates two kinds of carrier indexes indicative of the component carriers CC#1 and CC#2 to the downlink control information generating section 212 of the component carrier CC#1.

The downlink control information generating section 212 determines a carrier indicator corresponding to each of the component carriers indicated by the scheduler 211. In this case, the first bit of the carrier indicator is set at "0" indicating for component carrier indication, and the second and third bits are set at a carrier index indicated by the scheduler 211.

Further, the downlink control information generating section 212 assigns user data (PDSCH) to each mobile terminal apparatus 10 to a predetermined assignment frequency using the sub-band index indicated by the scheduler 211. Thus, the downlink control information generating section 212 determines the component carrier to assign the user data to the mobile terminal apparatus 10, and the assignment frequency of the user data in the component carrier by indication of the scheduler 211, and generates the downlink control information.

In the example as shown in FIG. 6, the downlink control information generating section 212 of the component carrier #1 generates the downlink control information for the user data of the component carrier #1, and the downlink control information for the user data of the component carrier #2. The downlink control information generated in the downlink control information generating section 212 is input to the transmission frame generating section 213.

Further, in scheduling user data for another subframe besides the same subframe on the downlink control channel, the scheduler 211 indicates a subframe index and a sub-band index to the downlink control information generating section 212. In this case, the scheduler 211 discriminates between a control channel that undergoes interference from the macro-cell C2 and a control channel that does not undergo the interference for each subframe. This discrimination of control channels is performed based on the shift amount in the time-axis direction of radio frames of the pico-cell C1 and the macro-cell C2, and a blank position of the radio frame of the macro-cell C2. The scheduler 211 judges a control channel corresponding to the blank period of the radio frame from the macro-cell C2 as undergoing interference from the macro-cell C2, while judging the other control channels as not undergoing the interference.

Then, in generating the downlink control information of the downlink control channel that does not undergo interference from the macro-cell C2, the scheduler 211 indicates subframe indexes of the corresponding subframe and a subsequent subframe of the downlink control channel that undergoes interference. For example, in FIG. 5, in generating the downlink control information of the subframe #1, the scheduler 211 indicates subframe indexes of the subframes #1 and #2.

The downlink control information generating section 212 determines a carrier indicator corresponding to each of the subframes indicated by the scheduler 211. In this case, the first bit of the carrier indicator is set at "1" indicating for subframe indication, and the second and third bits are set at a subframe index indicated by the scheduler 211.

Further, the downlink control information generating section 212 assigns user data (PDSCH) to each mobile terminal apparatus 10 to a predetermined assignment frequency using the sub-band index indicated by the scheduler 211. Thus, the downlink control information generating section 212 determines the subframe to assign the user data to the mobile terminal apparatus 10, and the assignment frequency in the subframe by indication of the scheduler 211, and generates the downlink control information.

In the example as shown in FIG. 5, when the downlink control information generating section 212 generates the downlink control information for the subframe #1, the section 212 generates the downlink control information for the user data of the subframe #1, and the downlink control information for the user data of the subframe #2. The downlink control information generated in the downlink control information generating section 212 is input to the transmission frame generating section 213.

The transmission frame generating section 213 multiplexes the downlink control information and user data (PDSCH), and applies the other transmission processing to generate a downlink transmission frame.

Figure 13:
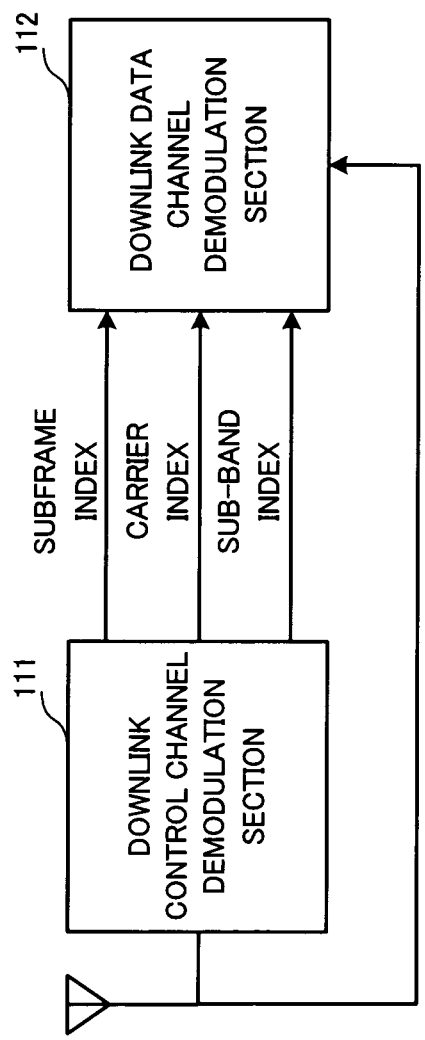
FIG. 13 is a conceptual diagram of a process of receiving the downlink transmission frame in the mobile terminal apparatus that communicates via the pico-cell.

Referring to FIG. 13, described is a process of receiving the downlink transmission frame in the mobile terminal apparatus that communicates via the pico-cell. FIG. 13 is a conceptual diagram of the process of receiving the downlink transmission frame in the mobile terminal apparatus according to this Embodiment. In addition, described herein is the process of generating a transmission frame in the case of applying the second interpretation method to the carrier indicator.

As shown in FIG. 13, the process of receiving the transmission frame has a downlink control channel demodulation section 111, and a downlink data channel demodulation section 112. The downlink control channel demodulation section 111 demodulates the downlink control information from the transmission frame from the base station apparatus 20, and acquires the subframe index, carrier index, and sub-band index from the downlink control information. In this case, the downlink control channel demodulation section 111 acquires the subframe index or carrier index from the carrier indicator of the demodulated downlink control information. Further, the downlink control channel demodulation section 111 acquires the sub-band index (assignment frequency) from the scheduling information of the demodulated downlink control information. The subframe index, carrier index and sub-band index are output to the downlink data channel demodulation section 112.

Based on the subframe index, carrier index and sub-band index, the downlink data channel demodulation section 112 demodulates the user data from the transmission frame. For example, at the time of cross-carrier scheduling, the user data is demodulated using the carrier index and the sub-band index. Further, at the time of scheduling of the user data to another subframe besides the same subframe on the downlink control channel, the user data is demodulated using the subframe index and the sub-band index.

In addition, in the above-mentioned process of generating a transmission frame and the process of receiving the transmission frame, described is the configuration in which the second interpretation method is applied to the carrier indicator, but the invention is not limited this configuration, and for example, a configuration in which the first interpretation method is applied may be adopted.

Figure 16:
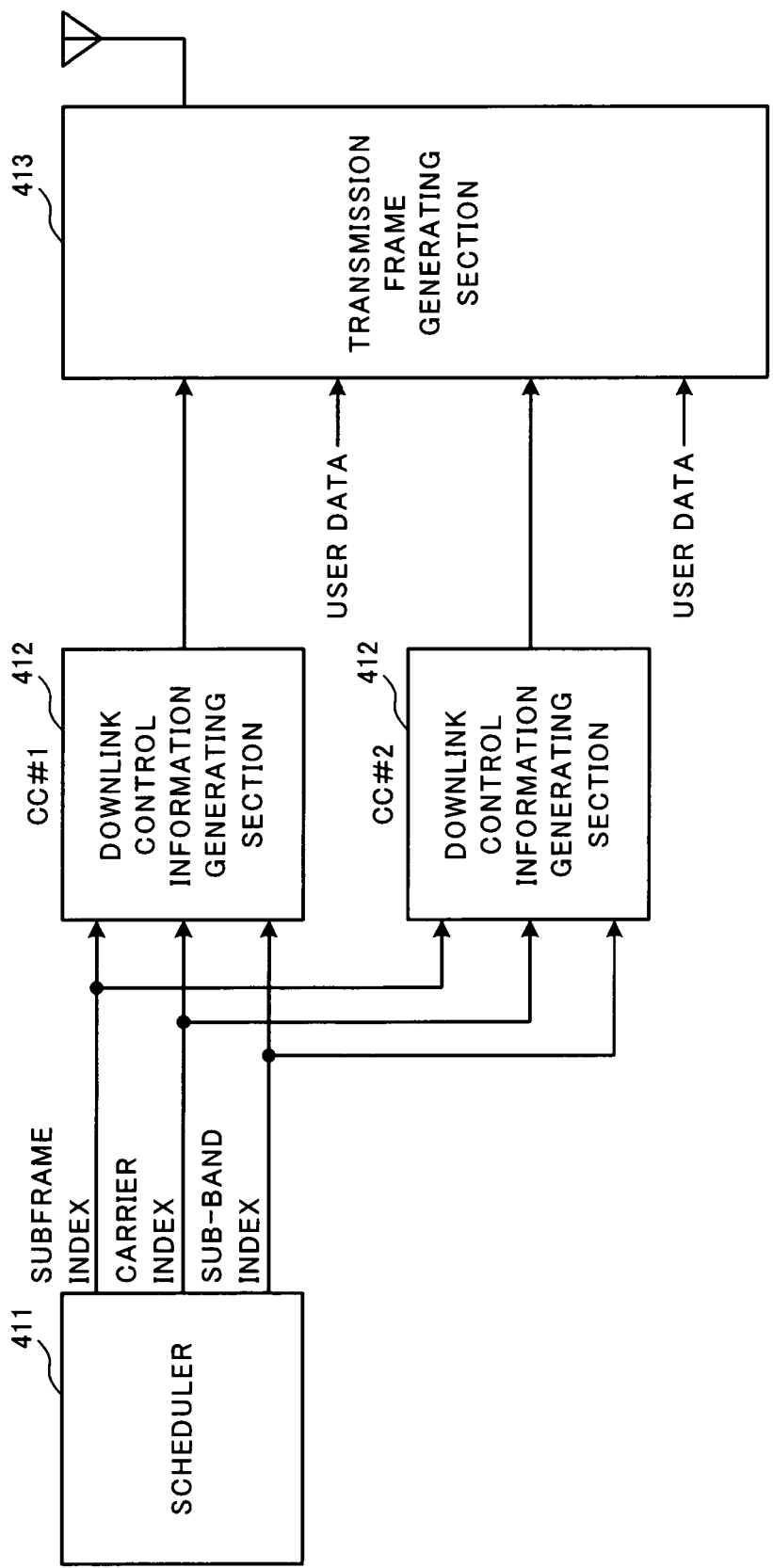
FIG. 16 is to explain a process of generating a downlink transmission frame in the base station apparatus that covers the macro-cell.

Referring to FIG. 16, described is a process of generating a downlink transmission frame in the base station apparatus that covers the macro-cell. FIG. 16 is a conceptual diagram of the process of generating a downlink transmission frame in the base station apparatus that covers the pico-cell according to this Embodiment. FIG. 16 exemplifies the base station configuration capable of supporting maximum M component carriers (CC#1 to CC#M).

As shown in FIG. 16, the process of generating a transmission frame has a scheduler 411, downlink control information generating sections 412, and a transmission frame generating section 413. The scheduler 411 indicates a subframe index, carrier index and a sub-band index (assignment frequency of user data) to the downlink control information generating section 412. For example, when the component carrier CC#2 undergoes strong interference, the scheduler 411 indicates two kinds of carrier indexes indicative of the component carriers CC#1 and CC#2 to the downlink control information generating section 412 of the component carrier CC#1.

Further, in generating downlink control information of a downlink control channel that is not set for off, the scheduler 411 indicates subframe indexes of the corresponding subframe and a subsequent subframe with the downlink control channel set for off. For example, in FIG. 14, in generating the downlink control information of the subframe #1, the scheduler 411 indicates two kinds of subframe indexes indicative of the subframes #1 and #2.

The downlink control information generating section 412 determines a carrier indicator using the carrier index and the subframe index indicated by the scheduler 411. In this case, the carrier indicator is determined from the correspondence relationship between the carrier index and the subframe index as shown in FIG. 15.

Further, the downlink control information generating section 412 assigns user data (PDSCH) to each mobile terminal apparatus 30 to a predetermined assignment frequency using the sub-band index indicated by the scheduler 411. Thus, the downlink control information generating section 412 determines the component carrier to which the user data to the mobile terminal apparatus 30 is assigned, subframe and the assignment frequency by indication of the scheduler 411, and generates the downlink control information. The downlink control information generated in the downlink control information generating section 412 is input to the transmission frame generating section 413.

The transmission frame generating section 413 multiplexes the downlink control information and user data (PDSCH), and applies the other transmission processing to generate a downlink transmission frame.

Figure 17:
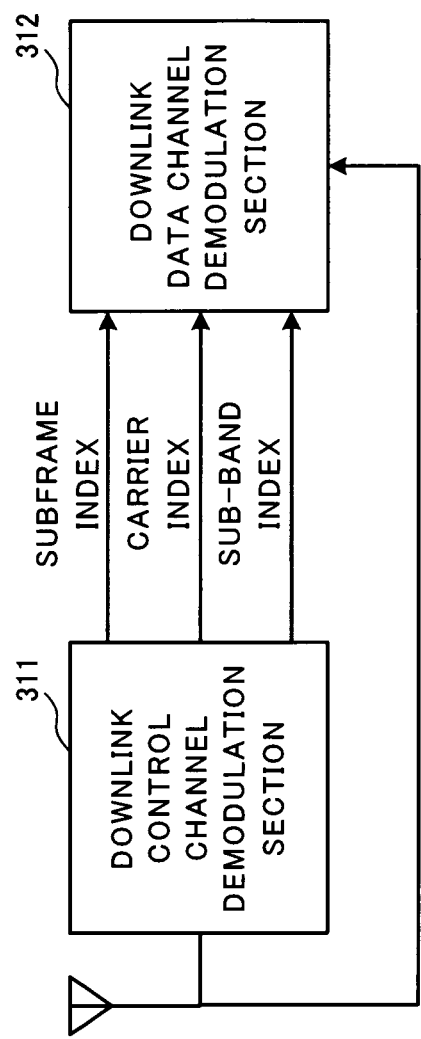
FIG. 17 is a conceptual diagram of a process of receiving the downlink transmission frame in the mobile terminal apparatus that communicates via the macro-cell.

Referring to FIG. 17, described is a process of receiving the downlink transmission frame in the mobile terminal apparatus that communicates via the macro-cell. FIG. 17 is a conceptual diagram of the process of receiving the downlink transmission frame in the mobile terminal apparatus according to this Embodiment.

As shown in FIG. 17, the process of receiving the transmission frame has a downlink control channel demodulation section 311, and a downlink data channel demodulation section 312. The downlink control channel demodulation section 311 demodulates the downlink control information from the transmission frame from the base station apparatus 40, and acquires the subframe index, carrier index, and sub-band index from the downlink control information. In this case, the downlink control channel demodulation section 311 acquires the subframe index or carrier index from the carrier indicator of the demodulated downlink control information. Further, the downlink control channel demodulation section 311 acquires the sub-band index (assignment frequency) from the scheduling information of the demodulated downlink control information. The subframe index, carrier index and sub-band index are output to the downlink data channel demodulation section 312.

Based on the subframe index, carrier index and sub-band index, the downlink data channel demodulation section 312 demodulates the user data from the transmission frame.

As described above, according to the base station apparatus 20 according to this Embodiment, it is possible to assign user data to another subframe indicated by the carrier indicator besides the same subframe on the downlink control channel. Accordingly, by indicating a subframe of a control channel that undergoes interference from the first system using the carrier indicator, it is possible to assign user data of the subframe that undergoes interference on the control channel of the subframe that does not undergo interference. Further, another subframe to which user data is assigned besides the same subframe is indicated using the carrier indicator, and it is thereby possible to make the control configuration simplified.

In addition, the aforementioned Embodiment describes the base station apparatus that covers the pico-cell as a small-scale cell, but the invention is not limited to this configuration. It is essential only that the base station apparatus covers a cell that undergoes interference from the macro-cell, and the base station apparatus may be small-sized base station apparatuses that cover a femto-cell, micro-cell and the like.

Further, in the above-mentioned Embodiment, the blank period indicates a period during which the radio frame of the pico-cell is not affected by interference from the radio frame of the macro-cell. In the radio frame of the macro-cell, the blank period may be a period during which no data is transmitted, or may be defined as a period during which data is transmitted to the extent that does not affect interference. Further, in the radio frame of the macro-cell, the blank period may be defined as a period during which transmission is performed with transmission power of the extent that does not have any effect of interference on the radio frame of the pico-cell. Furthermore, in the radio frame of the macro-cell, the blank period may be defined as a period during which transmission is performed with an interfering amount of the extent that does not affect the radio frame of the pico-cell.

Furthermore, in the above-mentioned Embodiment, such a configuration may be adopted in which the base station apparatus of the pico-cell receives signaling of the base statin apparatus of the macro-cell, alternatively, the reverse may be possible. Still furthermore, in using the MBSFN subframe, the base station apparatus of the macro-cell is configured to notify the base station apparatus of the pico-cell of the blank position.

The present invention is not limited to the above-mentioned Embodiment, and is capable of being carried into practice with various modifications thereof. For example, without departing from the scope of the invention, assignment of component carriers, the number of processing sections, processing procedures, the number of component carriers, and the number of aggregated component carriers in the above-mentioned description are capable of being carried into practice with modifications thereof as appropriate. Further, the invention is capable of being carried into practice with modifications thereof as appropriate without departing from the scope of the invention.

The present application is based on Japanese Patent Application No. 2010-087390 filed on Apr. 5, 2010, entire content of which is expressly incorporated by reference herein.

The invention claimed is:

1. A base station apparatus in a small-scale cell of a second system having a system band comprised of a single or a plurality of base frequency blocks, for sharing at least a part of a frequency band with a first system having a large-scale cell and covering the small-scale cell, wherein the base station apparatus comprising:
    an indication information generating section configured to generate indication information for a number of subframes, each subframe assigned individually to each of the plurality of the base frequency blocks constituting the system band of the second system, indicating another subframe to which user data is assigned besides a same subframe on a downlink control channel; and
    a transmission frame generating section configured to generate a transmission frame including the indication information.

2. The base station apparatus according to claim 1, wherein the indication information indicates another subframe that does not overlap a blank period of a transmission frame of the first system on a control channel of a subframe that overlaps the blank period provided in the transmission frame of the first system.

3. The base station apparatus according to claim 1, wherein the indication information is associated with the number of subframes between the subframe of the downlink control channel and another subframe to which user data is assigned on the downlink control channel.

4. The base station apparatus according to claim 1, wherein the indication information includes a determination bit to determine whether the information is for base frequency block indication to indicate a base frequency block or for subframe indication to indicate a subframe.

5. The base station apparatus according to claim 4, wherein the indication information includes an index bit that indicates a base frequency block index associated with each base frequency block when the information is to identify the base frequency block, while indicating a subframe index associated with each subframe when the information is to identify the subframe.

6. A mobile terminal apparatus that communicates via a second system having a system band comprised of a single or a plurality of base frequency blocks, for sharing at least a part of a frequency band with a first system having a large-scale cell and covering a small-scale cell, wherein the mobile terminal apparatus comprising:
    an indication information acquiring section configured to acquire, from a base station apparatus, indication information for a number of subframes, each subframe assigned individually to each of the plurality of the base frequency blocks constituting the system band of the second system, indicating another subframe to which user data is assigned besides a same subframe on a downlink control channel; and
    a data demodulation section configured to demodulate the user data based on the indication information.

7. The mobile terminal apparatus according to claim 6, wherein the indication information indicates another subframe that does not overlap a blank period of a transmission frame of the first system on a control channel of a subframe that overlaps the blank period provided in the transmission frame of the first system.

8. The mobile terminal apparatus according to claim 6, wherein the indication information includes information indicative of the number of subframes between the subframe of the downlink control channel and another subframe to which user data is assigned on the downlink control channel.

9. The mobile terminal apparatus according to claim 6, wherein the indication information includes a determination bit to determine whether the information is for base frequency block indication to indicate a base frequency block or for subframe indication to indicate a subframe.

10. The mobile terminal apparatus according to claim 9, wherein the indication information includes an index bit that indicates a base frequency block index associated with each base frequency block when the information is to identify the base frequency block, while indicating a subframe index associated with each subframe when the information is to identify the subframe.

11. A communication control method in a base station apparatus in a small-scale cell of a second system having a system band comprised of a single or a plurality of base frequency blocks, for sharing at least a part of a frequency band with a first system having a large-scale cell and covering a small-scale cell, wherein the communication control method comprising:
generating indication information for a number of subframes, each subframe assigned individually to each of the plurality of the base frequency blocks constituting the system band of the second system, indicating another subframe to which user data is assigned besides a same subframe on a downlink control channel; and
generating a transmission frame including the indication information.

12. A base station apparatus in a second system having a system band comprised of a single or a plurality of base frequency blocks, for sharing at least a part of a frequency band with a first system having a small-scale cell and covering a large-scale cell, wherein the base station apparatus comprising:
an indication information generating section configured to generate indication information for a number of subframes, each subframe assigned individually to each of the plurality of the base frequency blocks constituting the system band of the second system, indicating assignment of user data to another subframe in which a downlink control channel is not used besides a same subframe on a downlink control channel; and
a transmission frame generating section configured to generate a transmission frame including the indication information.

13. The base station apparatus according to claim 12, wherein before transmitting the transmission frame including the indication information to a mobile terminal apparatus, the base station apparatus notifies the mobile terminal apparatus of advance information to identify the subframe indicated by the indication information.

14. The base station apparatus according to claim 12, wherein the indication information is associated with the number of subframes between the subframe of the downlink control channel and another subframe to which user data is assigned on the downlink control channel.

15. The base station apparatus according to claim 14, wherein in addition to the number of subframes, the indication information is associated with a base frequency block used in indication of the another subframe.

16. A mobile terminal apparatus that communicates via a second system having a system band comprised of a single or a plurality of base frequency blocks, for sharing at least a part of a frequency band with a first system having a small-scale cell and covering a large-scale cell, wherein the mobile terminal apparatus comprising:
an indication information acquiring section configured to acquire, from a base station apparatus, indication information for a number of subframes, each subframe assigned individually to each of the plurality of the base frequency blocks constituting the system band of the second system, indicating assignment of user data to another subframe in which a downlink control channel is not used besides a same subframe on a downlink control channel; and
a data demodulation section configured to demodulate the user data based on the indication information.

17. A communication control method in a base station apparatus in a second system having a system band comprised of a single or a plurality of base frequency blocks, for sharing at least a part of a frequency band with a first system having a small-scale cell and covering a large-scale cell, wherein the communication control method comprising:
generating indication information for a number of subframes, each subframe assigned individually to each of the plurality of the base frequency blocks constituting the system band of the second system, indicating assignment of user data to another subframe in which a downlink control channel is not used besides a same subframe on a downlink control channel; and
generating a transmission frame including the indication information.

18. The base station apparatus according to claim 2, wherein the indication information is associated with the number of subframes between the subframe of the downlink control channel and another subframe to which user data is assigned on the downlink control channel.

19. The base station apparatus according to claim 2, wherein the indication information includes a determination bit to determine whether the information is for base frequency block indication to indicate a base frequency block or for subframe indication to indicate a subframe.

20. The mobile terminal apparatus according to claim 7, wherein the indication information includes information indicative of the number of subframes between the subframe of the downlink control channel and another subframe to which user data is assigned on the downlink control channel.

21. The mobile terminal apparatus according to claim 7, wherein the indication information includes a determination bit to determine whether the information is for base frequency block indication to indicate a base frequency block or for subframe indication to indicate a subframe.

22. The base station apparatus according to claim 13, wherein the indication information is associated with the number of subframes between the subframe of the downlink control channel and another subframe to which user data is assigned on the downlink control channel.

* * * * *